United States Patent [19]

Bentivoglio et al.

[11] Patent Number: 4,830,595

[45] Date of Patent: May 16, 1989

[54] DIE-LIP HEATER

[75] Inventors: Alfredo Bentivoglio; Ricardo P. Rodriguez, both of Mississauga, Canada

[73] Assignee: Polysystem Machinery Mfg. Inc., Mississauga, Canada

[21] Appl. No.: 45,514

[22] Filed: May 4, 1987

[30] Foreign Application Priority Data

May 8, 1986 [GB] United Kingdom ............... 8611188

[51] Int. Cl.⁴ ............................................. B29C 47/86
[52] U.S. Cl. .................................... 425/143; 219/201; 264/40.6; 425/144; 425/378.1; 425/DIG. 13
[58] Field of Search ............... 425/143, 461, 466, 467, 425/378 R, 550, DIG. 13, 144, 378.1; 264/40.6, 565, 567, 209.1; 219/201, 388; 165/185

[56] References Cited

U.S. PATENT DOCUMENTS

| | | | |
|---|---|---|---|
| 2,931,408 | 4/1960 | Dwyer et al. | 425/378 R X |
| 3,029,474 | 4/1962 | Voight et al. | 264/209.1 |
| 3,311,952 | 4/1967 | Kovach et al. | 425/378 R X |
| 3,422,493 | 1/1969 | Heston | 425/378 R X |
| 3,497,915 | 3/1970 | Ronden | 425/378 R X |
| 3,588,987 | 6/1971 | Korostoff et al. | 425/461 X |
| 3,743,252 | 7/1973 | Schott Jr. | 425/143 X |
| 3,752,635 | 8/1973 | Hinrichs | 425/461 |
| 3,767,346 | 10/1973 | Mihalik | 425/461 X |
| 4,332,543 | 6/1982 | Fulton et al. | 264/40.6 X |

FOREIGN PATENT DOCUMENTS

| | | |
|---|---|---|
| 149335 | 7/1985 | European Pat. Off. . |
| 3430825 | 3/1986 | Fed. Rep. of Germany . |
| 1197597 | 12/1959 | France . |
| 2018008 | 9/1969 | France . |
| 843320 | 8/1960 | United Kingdom ............... 425/143 |
| 960543 | 6/1964 | United Kingdom . |

Primary Examiner—Richard L. Chiesa
Attorney, Agent, or Firm—Anthony Asquith & Co.

[57] ABSTRACT

An extrusion die-set is disclosed for extruding plastic film, in which the nozzle-lips (6,8) are heated, for the purpose of allowing production speed to be raised without losing film-quality. The heaters include aluminum rings (62,82) embedded in grooves in the dies near the nozzle lips. The surfaces (66,67,86,87) of the ring that face away from the nozzle lips are cut away, so that heat transfer to the bulk of the dies (60,80) is reduced. The disclosed heaters eliminate the problem of hot-spots and cold-spots around the circumference of the nozzle. The nozzle lips can run several degrees hotter than the bulk of the dies, using the disclosed heaters.

1 Claim, 2 Drawing Sheets

DIE-LIP HEATER

This invention relates to a manner of heating the lip of a die, such as an extrusion die. The invention relates also to the production of plastic film by extrusion.

BACKGROUND TO THE INVENTION

It is common practice to manufacture plastic film in the following manner. First, plastic in molten—i.e. liquid and semi-liquid—form is extruded through an annular nozzle. The resulting bubble or tube of liquid is then subjected to an internal air pressure, which inflates the tube and causes it to balloon out to many times the diameter of the annular nozzle. The inflated tube cools and cures, and is gathered up on rollers.

The economics of the process gives rise to a compromise or trade-off between the quality of the extruded film and the speed at which the film is produced. If the film passes through the nozzle too quickly, the surface texture starts to acquire the so-called "sharkskin" quality. This problem is also referred to as "melt-fracture".

One way of alleviating the sharkskin effect is to increase the annular width of the nozzle gap. However, if the nozzle gap is wide, the film has to be stretched or inflated even more to get the thickness of the film down to the desired value. The more the tube is inflated, the more likely it is that the film will be uneven as to its thickness and also will have other inferior properties.

The invention is aimed at increasing the speed at which plastic film with good properties can be produced, while avoiding the difficulties of a sharkskin surface, and of avoiding also the difficulties of the variations in the thickness etc. of the film that would follow from increasing the width of the nozzle.

THE PRIOR ART

It has been recognized that the sharkskin phenomenon is due to the fact that the extrusion nozzle exerts a frictional drag on the uncured liquid plastic resin passing through the nozzle. The surface of the liquid is in contact with the lips of the nozzle and the surface is inevitably therefore travelling at a slower speed than the bulk of the liquid. The liquid is somewhat viscous, and has only a relatively small capacity to cope with internal velocity gradients.

When these velocity gradients are too large, the shear stresses between the surface and the bulk of the flowing resin become too great. The resulting film has the rough, cloudy surface associated with the sharkskin effect. It has been recognized that the onset of the sharkskin effect can be contained by reducing the friction between the moving resin and the lips of the nozzle. Attempts have been made to heat the lips of the nozzles; in theory, the higher temperature reduces the viscosity of the surface layer of the resin, thus reducing the internal shear stresses. It may be regarded that the more-liquid resin at the surface acts to lubricate the flow of resin through the nozzle.

The principle of heating the die-lips has been known for some time. An early example of an extrusion die equipped with nozzle-lip heaters for this purpose may be seen in the LONZA British Patent No. 843 320, published Aug. 04, 1960.

GENERAL DESCRIPTION OF THE INVENTION

The invention is aimed at heating the lips of the nozzles in such a way that the temperature and velocity gradients in the resin are as nearly constant as possible all around the circumference of the nozzle. It is recognized, in the invention, as most important that the lips be heated smoothly and evenly. There should be no local hot-spots or cold-spots around the circumference. It is recognized that the tube of film is extremely sensitive to temperature differences around the circumference—even to the extent that the lips of the extrusion nozzle should be protected from drafts in the surrounding air.

It has also been recognized that the heated lips be somewhat isolated or insulated from the main bulk of the dies. The purpose of the die-lip heaters is to reduce the difference between the temperature of the liquid that is actually in contact with the lips, and the temperature of the bulk of the liquid flowing through the nozzle. The bulk temperature of the liquid is set by other considerations, and the die-lip heaters should be prevented, by insulation, from affecting the bulk temperature.

The lip heaters should heat just the surface and not the bulk of the flowing liquid, and for that reason the effect of the lip heaters must not be felt anywhere but at the lip area of the nozzle.

It is recognised in the invention that, because of this need to insulate the die-lips, the desired evenness of temperature is by no means easy to achieve.

The problem may be regarded as inherent in the dimensions of the die. A typical annular extrusion nozzle, to which the invention might be applied, has a diameter in the region of 40 cm. In respect of such a nozzle, the outer lip, which surrounds the nozzle, has a circumferential length of about 125 cm. But the lip-heater must heat only the actual lips of the nozzle: a typical dimension to be heated being the final length of 1.5 to 2 cm, or less, at the mouth of the nozzle.

The larger the diameter of the nozzle, the worse the problem becomes. It is a benefit of the invention that the lip heater of the invention is suitable for use with larger nozzles.

It may be seen therefore that the outer lip heater of the above extrusion die is required to heat a surface that has a length of 125 cm and a height of less than 2 cm. At the same time, it must be borne in mind that the lip heater must not raise the temperature of the surrounding bulk of the die.

It is recognized in the invention that the full extent of the potential benefits available from lip heating have not hitherto been realised. This has been because previous lip heaters, though reducing the temperature gradients in the liquid, have not reduced those gradients evenly around the circumference of the nozzle. The die designer wishes to maximise the throughput of liquid through the nozzle, but without compromising any of the properties of the resulting plastic film: it is recognised in the invention that the throughput can be higher than has hitherto been the case, when care is taken in the design of the die to eliminate variations in the temperature gradient of the liquid around the circumference of the nozzle.

In the invention, the outer lip of the annular nozzle is provided with a ring of aluminum or other heat conducting material. The ring is let into a groove cut in the material of the die, close to the nozzle lip.

In the invention, everything about the ring and groove is aimed at ensuring that all points on the ring are maintained at the same temperature. That is why the ring is preferably made of a metal with a high heat-conductivity, such as aluminum, rather than steel.

The ring and groove are continuous and uninterrupted around the circumference. Neither the groove nor the ring varies, around the circumference, as to its cross-section.

The groove is deep enough that the ring within the groove is not exposed to drafts.

The ring is accompanied by a heating means, which may comprise a coil of heater wire. The coil is let into a groove which is cut, in turn, into the material of the ring.

The ring is arranged so as to transfer its heat to the nozzle lips, but so as not to transfer heat to the bulk of the die. This can be achieved by placing those surfaces of the ring that face the nozzle in intimate heat-transmitting contact with the material of the walls of the groove, while placing the surfaces of the ring that face away from the lips, and towards the bulk of the die, in a spaced apart, insulating, relationship with the walls of the groove.

Using the invention, it has been found possible for the nozzle lips to settle to a considerably higher temperature than the bulk of the dies, and for that higher temperature to be the same at all points around the nozzle. It has been found, as a result, that the throughput that can be achieved before melt-fracture starts to occur is thereby increased.

It is recognized in the invention that previous proposals for heating the nozzle lips have been less successful because not enough attention was paid to keeping the temperature even all around the circumference of the nozzle.

To achieve the required evenness of temperature around the circumference, i.e. to ensure that the ring cannot sustain a difference between the temperatures at different points around the ring, in essence the ring must either be of a large cross-sectional area, or the ring must be made of a highly conductive material. But it is recognised in the invention that the latter of these two options has an advantage over the former, in that if the ring were to be of large cross-sectional area, inevitably it would be difficult to prevent the ring from passing its excess heat to the bulk of the die. Therefore, the other option is preferred, i.e. it is preferred that the ring be of a good heat-conducting material, so that the ring may have a small cross-sectional area.

It is recognised in the invention that it is preferable that the ring of the invention should not itself constitute the lip of the nozzle. This is because aluminum, or other heat-conducting material such as copper, is relatively soft. The metal of the lip itself, which is in direct contact with the fast-moving hot liquid, on the other hand must be adequately hard, such that in practice steel is preferred for the material in which the lip is formed.

In the broadest scope of the invention, though, it is contemplated that the lip be formed directly in the material of the ring. However, as pointed out, this arrangement is not preferred because then the heat conductive properties of the material of the ring would have to be compromised by the requirement of the material to resist wear due to direct contact with the hot liquid.

Furthermore, when the lip is formed in the ring, not in the die, there is inevitably a junction between the two. This junction would be located right in the critical area, i.e. about 2 cm down from the mouth of the nozzle, and it would be a very difficult problem to ensure (a) that there was no significant step at the junction, (b) to keep such a step even all round the circumference, and (c) to prevent the step from affecting the free flow of liquid through the nozzle, especially since the ring, being hotter than the rest of the die, will expand differently from the die. It is therefore preferred that the lip be constituted by the material of the bulk of the die, and not by the material of the ring.

Preferably, in the invention, the inner lip is equipped with a similar heater. This is not so critical, however, because the length:area dimensions of the inner lip are not so extreme, and because the inner lip is of course protected from the surroundings by the bubble of just-extruded liquid. That is not to say that un-evenness of the temperature around the inner lip can be tolerated, but rather that the required evenness of temperature is easier to obtain.

BRIEF DESCRIPTION OF THE DRAWINGS

In order that the invention may be more fully understood, an example of a film extrusion apparatus that embodies the invention will now be described, with reference to the accompanying drawings, in which.

DETAILED DESCRIPTION OF THE DRAWINGS

Figure 1:
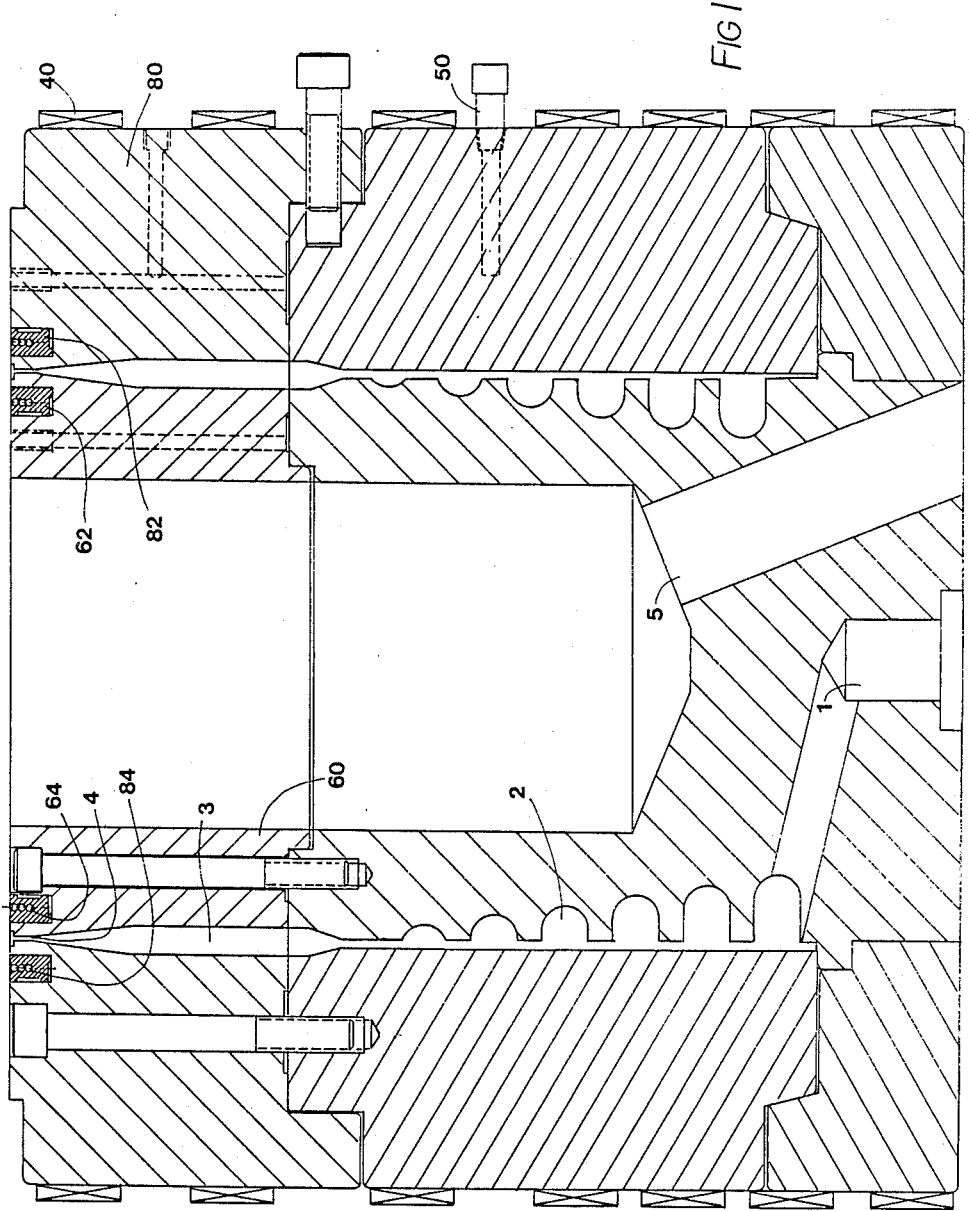
FIG. 1 is a cross-sectional view of an extrusion die which embodies the invention.
Figure 4:
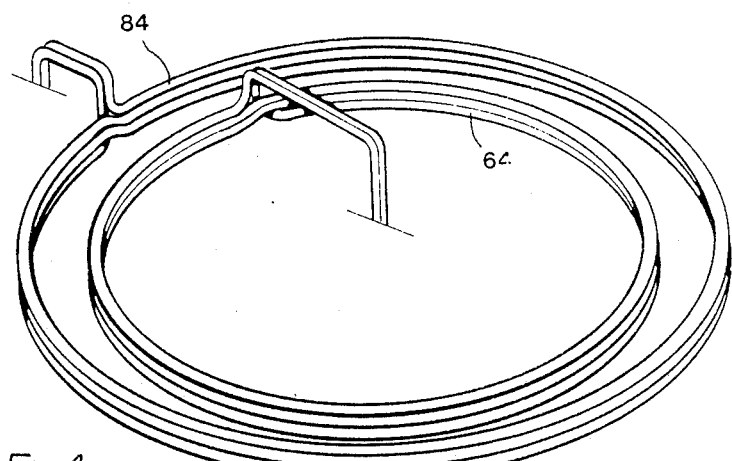
FIGS. 3 and 4 are pictorial views of components of the die of FIG. 1.
Figure 3:
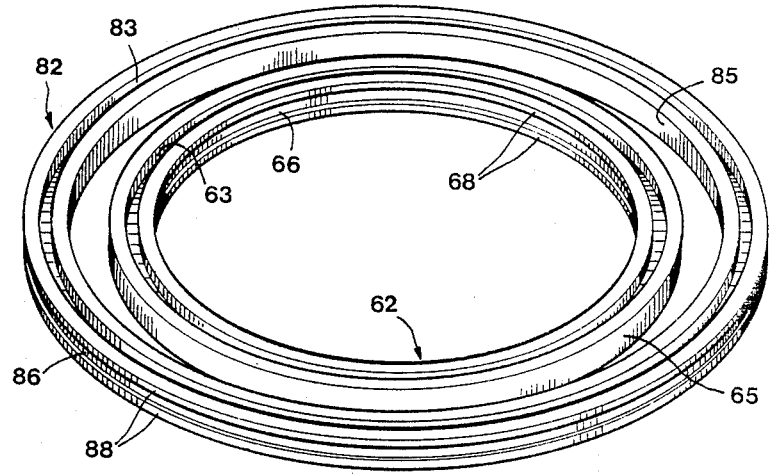
Figure 2:
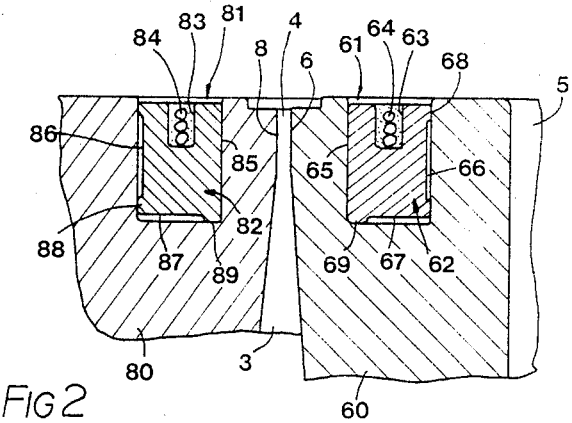
FIG. 2 is a close-up view of part of the extrusion nozzle of the die of FIG. 1.

In the drawings, the physical features of the components have been shown somewhat exaggerated for the sake of clarity.

The die set shown in FIG. 1 is conventional apart from the heaters. Molten or liquid resin is fed under pressure through a conduit 1, through a spiral channel 2, and into a collecting chamber 3. The resin then passes through the annular nozzle 4.

Air is blown into the centre of the annulus, through the passage 5, and the air inflates the extruded tube. The plastic cools and cures in a few seconds. The tube is collapsed between pinch rollers, and coiled onto a drum, or collected in some other suitable manner. The tube may be slit and sold as plastic film or may remain in tubular form for manufacture into plastic bags.

The nozzle 4 has an inner lip 6, which is formed on an inner die 60, and an outer lip 8, which is formed on an outer die 80.

Formed in each of the dies 60,80 are respective heater grooves 61,81. In these grooves are fitted respective aluminum heater rings 62,82. The rings 62,82 each have a respective coil-receiving groove 63,83, into which a respective coil of heater-wire 64,84 is inserted.

The surfaces 65,85 of the rings 62,82 which face towards the nozzle are arranged to fit intimately against the complementary surfaces of the grooves 61,81, over the full area of these inter-engaging surfaces. This ensures a good heat transfer between the rings 62,82 and the nozzle lips 6,8.

The surfaces 66,86,67,87 of the rings 62,82 which face away from the nozzle 4 are arranged to be spaced away from the complementary surfaces of the grooves 61,81. The purpose of this is that only a small amount of heat is transferred between the rings 62,82 and the bulk of the dies 60,80.

It is important, though, that small lands 68,88 be left on the surfaces 66,86 of the rings 62,82. These lands 68,88 ensure that the rings 62,82 are a tight fit in the grooves 61,81.

It is important for the rings to be a tight fit in the grooves because the rate of expansion of the aluminum of the rings is different from that of the steel of the dies. If the aluminum were not tightly constrained, the intimate and heat-transferring contact might be lost, i.e. the intimate contact that exists between the surfaces 65,85 of the rings 62,82 and the complementary surfaces of the grooves 61,81. This intimate contact might tend to work loose after a number of cycles of expansion and contraction. The tight fit ensures that the surfaces 65,85 are always pressed tightly against the sides of the grooves and therefore able to transmit heat to the lips 6,8 of the nozzle 4.

Small lands 69,89 have also been left on the bottom surfaces 67,87 of the rings. These lands ensure that there is little heat conducted from the rings to the dies through the bottom surfaces. The lands 69,89 could in fact be omitted, and the rings could be left quite free of all contact with the bottom of the groove. The lands 69,89 do however serve to define the point at which the rings 62,82 reach bottom in the grooves 61,81.

In the particular apparatus illustrated, the nozzle 4 has a diameter of 40.6 cm. The outer groove 81 has an outer diameter of 45.1 cm and an inner diameter of 42.5 cm. The inner groove 61 has an outer diameter of 39.4 cm and an inner diameter of 36.8 cm. Both grooves have a depth of 1.9 cm. The cross-sectional areas of both grooves are both equal to about 2.42 sq cm.

The coils 64,84 comprise each a few turns of electrical resistance wire. Again, every attempt is made to keep the heater rings, and therefore the nozzle lips, as even in temperature as possible around the circumference. The coils may be embedded in a refractory cement within the grooves 63,83. It will be noted that the cement need not be compatible with the aluminum as regards expansion rate, because both the rings and the coils are very tightly constrained by the presence of the comparatively massive dies against movement relative to each other.

We claim:

1. Apparatus which is suitable for use in producing plastic film by extrusion; characterised:

in that the apparatus includes an inner die (60) and an outer die (80);

in that the dies have complementary surfaces which comprise the respective inner (6) and outer (8) lips of an annular nozzle (4);

in that the apparatus includes an outer lip heater;

in that the outer lip heater is incorporated within the bulk of the outer die, and lies in close-spaced adjacency to the outer lip;

in that the outer lip heater includes an annular ring (82), and a means (84) for heating the ring;

in that the ring (82) is made of a good heat-conducting material, whereby all locations around the annulus of the ring are constrained to be at substantially the same temperature;

in that the ring (82) is formed from a single piece of material, which is separate from the bulk of the outer die, and which extends continuously and without interruption around the annulus of the ring;

in that the form of the ring in cross-section taken at one radius of the ring is in substance identical to the form of the ring in cross-section taken at every other radius of the ring;

in that the apparatus includes a means for ensuring that heat from the ring (82) is transferred easily and evenly to the outer lip (8) of the nozzle (4);

in that the apparatus includes a heat-insulating means for insulating the bulk of the outer die (80) against heat transfer from the said ring (82);

in that the outer die is provided with a deep annular groove (81);

in that the ring is received inside the groove;

in that the depth of the groove is such that substantially all of the ring (82) is effectively isolated against the impingement against the ring of drafts in the surrounding air;

in that the groove (81) is defined by a base, an inner wall, and an outer wall;

in that the outer lip is formed in the material of the outer die;

in that the inner wall of the groove is in close proximity to the outer lip;

in that the dimensions of the ring and of the groove are such that the ring is a tight fit between the inner wall and the outer wall;

in that the said heat conduction means comprises an area of intimate heat-conducting contact between the inner wall of the groove and the corresponding surface (85) of the ring which faces the said inner wall;

in that the said area occupies substantially the whole area of the inner wall;

in that the said heat insulating means comprises an air-space between the outer wall of the groove and the corresponding outer surface (86) on the ring which faces the said outer wall, and an air-space between the base of the groove and the corresponding bottom surface (87) on the ring that faces the said base;

in that the said air-spaces occupy respectively at least a major part of the whole area of the said outer wall, and at least a major part of the whole area of the said base;

in that the outer lip heater includes a heating element;

in that the heating element comprises a length of electrical heating wire wound into a coil (84);

in that the coil is disposed around the annulus of the ring (82);

in that the ring is provided with a wire-containing groove (83);

and in that the coil of wire is positioned in the wire-containing groove (83) in the ring.

* * * * *